US011811884B1

(12) United States Patent
Gochenaur et al.

(10) Patent No.: US 11,811,884 B1
(45) Date of Patent: Nov. 7, 2023

(54) TOPIC SUBSCRIPTION PROVISIONING FOR COMMUNICATION PROTOCOL

(71) Applicant: Amazon Technologies, Inc., Seattle, WA (US)

(72) Inventors: Nicholas A. Gochenaur, Vashon, WA (US); Gary Keith Wicker, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/119,847

(22) Filed: Dec. 11, 2020

(51) Int. Cl.
*G06F 15/16* (2006.01)
*H04L 67/51* (2022.01)
*H04L 67/306* (2022.01)

(52) U.S. Cl.
CPC ............ *H04L 67/51* (2022.05); *H04L 67/306* (2013.01)

(58) Field of Classification Search
CPC .............................. H04L 67/16; H04L 67/306
USPC ....................................................... 709/217
See application file for complete search history.

(56) References Cited

U.S. PATENT DOCUMENTS

| | | | |
|---|---|---|---|
| 2017/0339020 A1* | 11/2017 | Khanna | H04L 67/306 |
| 2018/0167476 A1* | 6/2018 | Hoffner | H04L 67/26 |
| 2018/0183862 A1* | 6/2018 | Huh | H04L 67/125 |
| 2018/0213378 A1* | 7/2018 | Brown | H04L 67/12 |
| 2019/0222640 A1* | 7/2019 | Tock | G06F 9/542 |
| 2019/0288975 A1* | 9/2019 | Hara | G06F 13/00 |
| 2020/0178237 A1* | 6/2020 | Kakinada | H04W 72/0446 |
| 2020/0301387 A1* | 9/2020 | Nill | H04L 12/2823 |
| 2021/0029202 A1* | 1/2021 | Banerjee | H04L 67/2838 |
| 2022/0085977 A1* | 3/2022 | Toscano | H04L 9/065 |

* cited by examiner

*Primary Examiner* — Alan S Chou
(74) *Attorney, Agent, or Firm* — Davis Wright Tremaine LLP

(57) ABSTRACT

A service provider receives a request to attach a subscription to a client node. The request can be an authenticated request by an entity associated with the client node. In response to the request, information is stored that indicates the client node is authorized for the subscription. A service can determine a connection by the client node to a service. The connection can trigger the subscription to be created for the client node.

20 Claims, 9 Drawing Sheets

TOPIC SUBSCRIPTION PROVISIONING FOR COMMUNICATION PROTOCOL

BACKGROUND

Electronic devices and computing systems have become ever-present in many aspects of society. Devices are found in the workplace, at home, and at school. Computing systems may include computing and data storage systems to process and store data. Some computing systems have begun offering centralized, virtual computing options known as online service provider environments that can reduce overall information technology (IT) costs, improve IT availability, improve IT scalability, and reduce time to deploy new applications in an IT environment.

Advancements in communication technologies have allowed for even relatively simple electronic devices to communicate with other devices and computing systems over a computer network. Computing networks or service provider environments may also communicate with Internet of Things (IoT) devices to gather and generate data or perform other functions. Computing devices, including IoT devices, can communicate with each other or with other networked devices using various protocols. The various protocols may be employed by the computing devices to send data and to receive commands from other devices. The amount of communications and data communicated using the various protocols can be described as data load of computing system. This load can have significant effects on devices that are often already resource constrained.

BRIEF DESCRIPTION OF THE DRAWINGS

Various techniques will be described with reference to the drawings, in which.

DETAILED DESCRIPTION

Figure 1A:
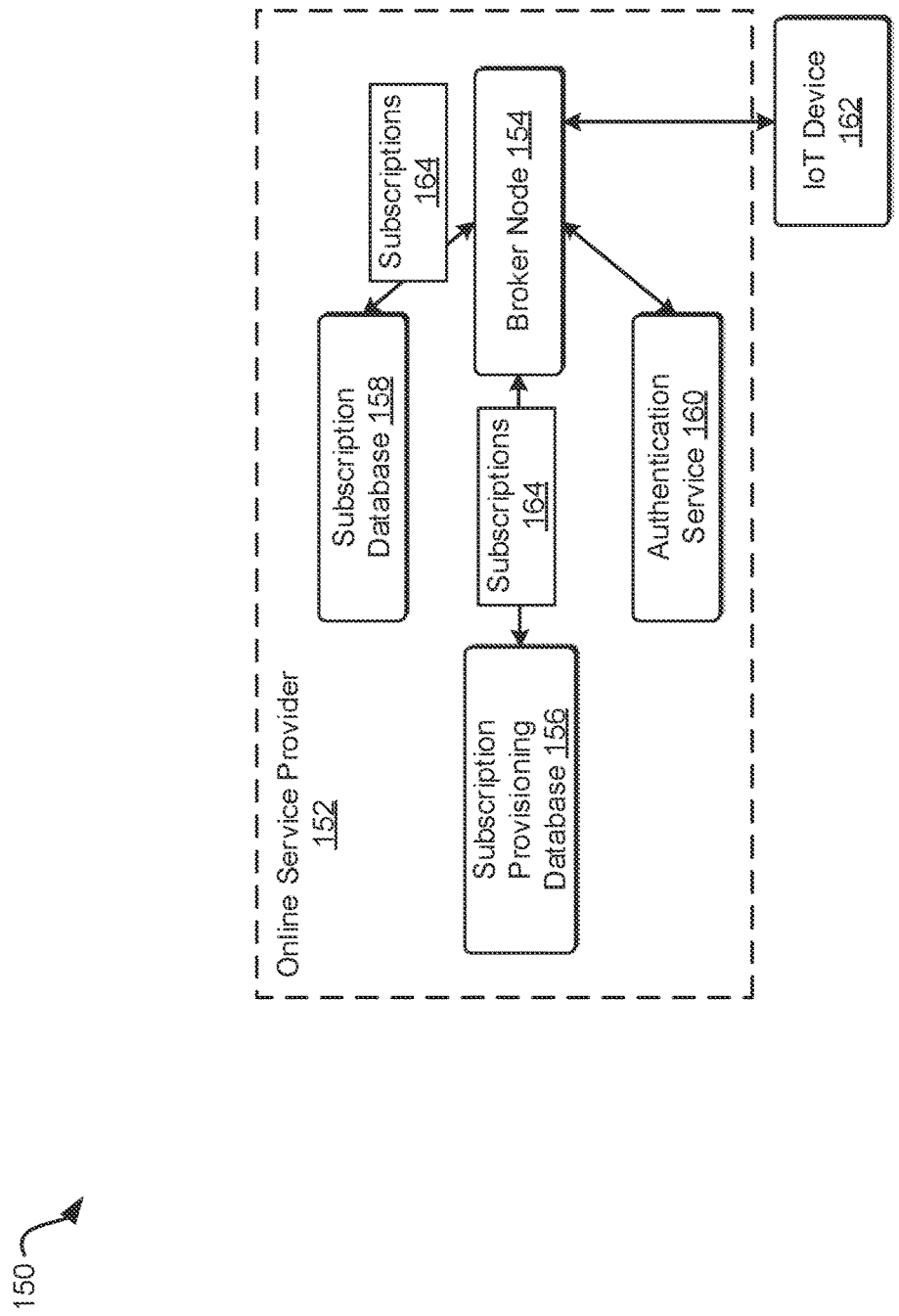
FIG. 1A illustrates a computing environment to provide centralized allocation of topic subscriptions for computing nodes, in accordance with at least one embodiment.

The described techniques provide a communication protocol with a message subscription framework that reduces data load in a computing system of an online service provider and improves operational efficiencies for client nodes that communicate using the message subscription framework. In an example, messages in a computing environment of the online service provider can be communicated between computing devices, such as client nodes, through a broker node using various protocols. The various protocols can include a publish/subscribe communication protocol, which implements a messaging configuration where senders of messages, called publishers, publish messages to topics. Client nodes can subscribe to topics to receive messages associated with those topics. Any number of client nodes can subscribe to a topic. The broker node handles receipt and distribution of messages linked to topics. Data load in the computing system is controlled using a centralized topic subscription technique that reduces message dissemination in the computing system of the online service provider.

In an example, client nodes are authenticated for subscriptions to topics through the centralized topic subscription technique. A client node can establish a communication connection with the broker node. The broker node can recognize the client node based on a client node identifier (ID) of the client node. The client node can provide the client node ID upon establishing connection with the broker node. The broker node can use the client node ID to search a storage system for subscriptions authenticated (e.g., assigned) for the client node. In an example, the storage system is a database used by the broker node to provision a storage system the broker node uses to store topic subscriptions linked to client nodes. The storage system, that the broker node uses to store the topic subscriptions linked to the client nodes, can be a database of the broker node. Thus, using the centralized topic subscription technique, at least some of the client nodes communicating with the broker node are relieved of having to generate and communicate topic subscription request messages to the broker node. Reducing the number of subscription request messages communicated to the broker node can reduce the overall data load in the computing system of the online service provider. Furthermore, compute and storage resources of the client nodes can be allocated to other functional features of the client nodes by reducing or eliminating subscription request messages generated and communicated by the client nodes. Thus, the client nodes can operate with enhanced efficiencies.

The storage system, that the broker node uses to provision the database including topic subscriptions linked to the client nodes, can be provided by a computer system of the online service provider. In an example, client nodes and topic subscriptions linked to those client nodes are stored in the storage system by calling a programmatic interface, such as an application programming interface (API). In an example, a customer of the online service provider calls the programmatic interface to attach subscriptions to at least one client node. Calling the programmatic interface causes a computer system of the online service provider to store client node IDs and topic subscriptions linked to those client IDs. The client node IDs and the subscriptions can be stored in the storage system that the broker node uses to provision its database, which includes topic subscriptions linked to the client nodes.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) reducing data load on computing systems by curtailing message traffic, linked to topic subscription requests, processed by the computer systems; (2) simplifying client node software by, in some embodiments, centralizing subscription topic registration, resulting in greater compute efficiencies and reduced data storage in client nodes and computing systems; (3) enabling a message broker node to quickly and efficiently process incoming and outgoing messages by reducing the amount of subscription requests processed by the message broker, etc.

FIG. 1A illustrates a computing environment 150 to provide centralized allocation of topic subscriptions for computing nodes, in accordance with at least one embodiment. The computing environment 150 can include an online service provider 152. The online service provider 152 can include computer systems comprising one or more processors and storage, such as volatile and nonvolatile storage. The online service provider 152 is illustrated as including a broker node 154 and a subscription provisioning database 156. In an embodiment, the broker node 154 is implemented by an instance of code executed by a computer system of the online service provider 152. In an embodiment, the subscription provisioning database 156 is hosted by a computer system of the online service provider 152.

The broker node 154 can have access to a subscription database 158 and an authentication service 160. In an embodiment, the subscription database 158 is hosted by a computer system of the service provider 152. Furthermore, in an embodiment, the authentication service 160 is implemented through at least one computer system of the online service provider 152. The subscription database 158 can comprise topic subscriptions for devices that have authenticated access to the broker node 154. The authentication service 160 can be used by the broker node 154 to authenticate devices that connect to the broker node 154. In an embodiment, the authentication service 160 can include identity and access management (IAM) policies assigned to devices or nodes that have authorized access to the broker node 154. The broker node 154 can use the authentication service 160 and its IAM policies to confirm a device attempting to access the broker node 154 has authorized access to services provided by the broker node 154.

The broker node 154 can facilitate communication between the client nodes using various communication protocols, such as a publish/subscribe protocol also referred to as a pub/sub protocol. In an embodiment, the pub/sub protocol provides a messaging configuration where senders of messages, called publishers, publish messages to topics or classes. Similarly, subscribers can express interest in one or more topics by subscribing to a topic to receive messages that are of interest. Any number of subscribers may subscribe to a topic. According to the techniques described herein, client nodes can be subscribed to topics via the subscription provisioning database 156, which advantageously circumvents the use of subscription request messages. Specifically, in an embodiment, client nodes do not need to send subscription request messages to subscribe to topics.

In an example, an internet of things (IoT) device 162 can connect to the broker node 154. In an embodiment, the IoT device 162 can be a consumer product used in the home, or it may be a commercial, industrial, agricultural, or other business computing device. The IoT device 162 can have some form of networking hardware, a processor, memory, and capability to communicate over a network (such as, but not limited to, Bluetooth, BLE (Bluetooth Low Energy), Wi-Fi, ZigBee (an IEEE 802.15.4-based specification for a suite of high-level communication protocols), Z-Wave (a mesh network using low-energy radio waves), NFC (Near Field Communication), digital radio transmission, wired connection, and other such technologies). The broker node 154 can access the authentication service 160 to determine that the IoT device 162 is authenticated, based on an IAM policy assigned to the device 162, to access the broker node 154. Authenticating the device 162 can be facilitated through a device ID associated with the IoT device 162 and received by the broker node 154 when the device 162 connects to the broker node 154.

In an embodiment, the broker node 154 uses the device ID of the IoT device 162 to store, in the subscription database 158, topic subscriptions authenticated for the device 162. For example, the broker node 154 accesses and searches the subscription provisioning database 156 using the device ID of the IoT device 162. In an embodiment, the subscription provisioning database 156 can include a plurality of device ID references having associated respective topic subscriptions. The broker node 154 retrieves the topic subscriptions 164 that are authorized for the device 162 and associated with its device ID. The broker node 154 then stores the topic subscriptions 164 and the device ID in the subscription database 158. In an embodiment, the broker node 154 references the subscription database 158 to route received messages to devices that subscribe to topics of those received messages. Using the described techniques, the broker node 154 can populate the subscription database 158 without having to receive subscription request messages from devices connecting to the broker node 154.

Figure 1B:
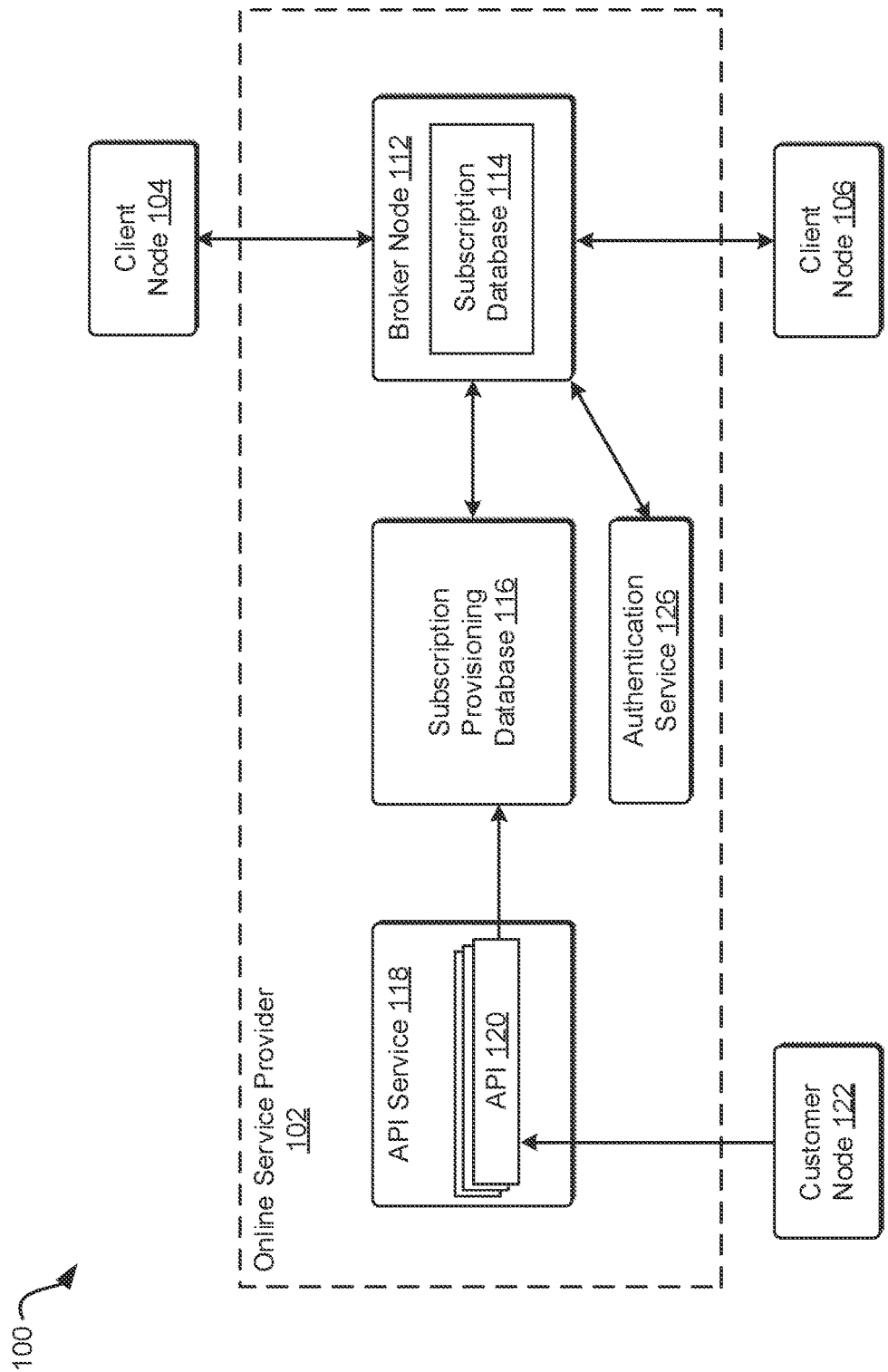
FIG. 1B illustrates another computing environment to provide centralized allocation of topic subscriptions for computing nodes, in accordance with at least one embodiment.

FIG. 1B illustrates a computing environment 100 to provide centralized allocation of topic subscriptions for computing nodes, in accordance with at least one embodiment. The computing environment 100 can include an online service provider 102. The online service provider 102 can provide storage and backup services, data processing services, key management services, virtual computing services, financial services, shopping services, and many other computing and data access services. Access to the online service provider 102 is generally controlled by a variety of authentication and authorization techniques such as username/password pairs, digital certificates, network address filters, and biometric identification. When accessing the online service provider 102, a customer can provide the appropriate authentication information to the online service provider 102, and the online service provider 102 grants access. In an embodiment, the online service provider 102 can implement an authentication service 126, which provides at least the functionality of the authentication service 160 illustrated in FIG. 1A. In some environments, customers of the online service provider 102 obtain use of a variety of resources and services, such as computing nodes, servers, virtual machines, and other network-connected computing appliances.

In an embodiment, the online service provider 102 facilitates communication between client nodes 104 and 106 via a broker node 112. In an embodiment, the broker node 112 can be implemented on a computer system, including a processor and storage, that executes an instance of broker node code. The broker node 112 can facilitate communication between the client nodes 104 and 106 using various communication protocols, such as a publish/subscribe protocol. The pub/sub protocol provides a messaging configuration where senders of messages, called publishers, publish messages to topics or classes. Similarly, subscribers can express interest in one or more topics by subscribing to a topic to receive messages that are of interest. Any number of subscribers may subscribe to a topic. In an embodiment, each of the client nodes 104 and 106 is a computing device that can include at least one processor in an associated storage medium. Each of the client nodes 104 and 106 can be a software entity realized by instructions executed by one or more processors.

In an embodiment, the online service provider 102 and the broker node 112 can implement one or more communication protocol technologies, including message queuing telemetry transport (MQTT), advanced message queuing protocol (AMQP), extensible messaging and presence protocol (XMPP), data distribution service (DDS), hypertext transfer protocol (HTTP), and/or constrained application protocol (CoAP). Although the client nodes 104 and 106 are depicted as having a particular location, external of the environment of the online service provider 102, nothing prevents the nodes 104 and 106 from being located in another location. In addition, any number of client nodes can be connected to the broker node 112.

The broker node 112 manages receipt and distribution of messages. The broker node 112 can include a subscription database 114 that includes topic subscriptions associated with the client nodes 104 and 106. In an embodiment, the broker node 112 can manage subscriptions for thousands, millions, or any number of nodes across thousands, millions, or any number of topics. To compensate for the many nodes and topics, the subscription database 114 may be distributed across many servers of the online service provider 102.

The client nodes 104 and 106 can subscribe to topics by communicating subscription request messages to the broker node 112. However, such subscription request messages, originating from many client nodes, can consume significant network bandwidth and cause the broker node 112 and the online service provider 102 to allocate significant compute resources for processing the many subscription request messages. According to the techniques described herein, client nodes 104 and 106 can be subscribed to topics via a subscription provisioning database 116 and an application programming interface (API) service 118, which advantageously circumvent the use of subscription request messages. In an embodiment, the subscription provisioning database 116 is hosted by one or more computer systems of the online service provider 102. The API service 118 can be realized by one or more computer systems of the online service provider 102. In an example, the API service 118 is implemented through instructions executed by one or more computer systems of the online service provider 102.

In an embodiment, the subscription provisioning database 116 can store subscriptions linked or attached to a plurality of client nodes. Specifically, the subscription provisioning database 116 can store a plurality of client IDs. Individual client IDs of the plurality of client IDs can have an associated set of subscriptions to topics authenticated for a client node identified by the client ID. The subscription provisioning database 116 can be populated with client IDs and associated subscriptions using the API service 118. In an embodiment, the client ID can be a certificate resource name (RN), e.g., for an x.509 certificate of the respective client having the client ID, namespace indicator, or another indicator recognized by the provider 102. For example, the client ID can be an identifier of a digital certificate provisioned to and/or installed on a device. Generally, the client ID comprises information usable to determine whether a client node connected to a service should be subscribed to a set of topics associated with the client ID. In an embodiment, the client ID is unique to a client device, although in other embodiments, the client ID can be an identifier of a group of devices, the number of members of which may or may not change over time.

The API service 118 can include one or more APIs. For example, the API service 118 can include an API 120. The API 120 can be called to provision the subscription provisioning database 116. In an embodiment, a customer of the online service provider 102 interfaces with the API service 118 using a customer node 122. The customer node 122 can be a computing device providing a graphical user interface that allows a user to interface with the API service 118 to call the API 120. In an embodiment, the customer node 122 can be a software enabled agent that interfaces with the API service 118 to call the API 120. The software enabled agent can be triggered to interface with the API service 118 to call the API 120 in response to a workflow service provided by the online service provider 102. In an embodiment, the workflow service can be triggered based on an initial equipment or software onboarding process that can be used to identify one or more client nodes that are to have authorized access to one or more services of the online service provider 102. In an embodiment, the workflow service can be executed in advance of one or more client nodes, first connecting with the online service provider 102 or the broker node 112, or subsequent to one or more client nodes having undergone an update process that changes or otherwise modifies a software and/or hardware configuration of the one or more client nodes.

API calls by the APIs of the API service 118 can be inter-process communication (IPC) calls or remote procedure calls (RPCs). IPC calls can be formatted according to a syntax used by the system, such as Python, Ruby, or Swift. RPCs can be formatted according to a syntax used by systems of the online service provider 102, such as using open network computing remote procedure call (ONC RPC) or service-orientated computing environment (SORCER).

Additionally, at least some of the APIs of the API service 118 can be representational state transfer (REST) compliant APIs. The APIs may be exposed to a client application or other common REST tool. For example, if a customer of the provider 102 interacts with a web interface, the APIs may be exposed as JavaScript. In general, a customer can interact with one of the APIs of the API service 118 using an API client (e.g., Postman), a programming language (e.g., Python), or via the terminal of a node (e.g., customer node or a node hosted by the provider 102) by using a command line program (e.g., cURL). APIs and commands of the APIs in the API service 118, including invocation of a single API a plurality of times, can be chained together to form an API script, allowing for the automation and integration of various service features provided using the APIs of the service 118.

In an embodiment, the customer node 122 calls the API 120. In an embodiment, the API 120 can include a plurality of parameters, such as URI parameters. A number of the parameters can be defined through the customer node 122. In an embodiment, a parameter of the API 120 can be used to identify one or more client IDs. These client IDs can be associated with the client nodes 104 and 106. In addition, the API 120 can include a parameter to specify one or more topic subscriptions. In an embodiment, the parameter can specify a path or location of a storage node that includes topic subscriptions to attach to at least one client node. In an embodiment, a parameter of the API 120 can be used to specify a digital file or other structured format that contains topic subscriptions to attach to at least one client node. In an example, the topic subscriptions and associated client IDs can be contained electronic files, such as text files, image files, PDF files, XLM files, YAML files, JSON files, or the like. The parameter of the API 120, in an example, can be used to specify a URL or other link/reference to a location where the topic subscriptions and associated client IDs are stored, such as an S3 bucket/object, a dynamoDB table, etc.

In an embodiment, the topic subscriptions are in a hierarchical string format. For example, the topic subscriptions assigned to the client IDs can be in MQTT topic string format. MQTT employs topic strings to separate the space of messages, similar to directories and subdirectories in hierarchical file systems. Client nodes publish messages to topics, and client nodes are subscribed to topics so they only receive messages for topics that they are subscribed to. By way of example, a message published to a topic string of: "topic1/x1/y2/z3/data" would be received by a client node subscribed to: "topic1/x1/y2/z3/data." In an embodiment, the broker node 112 facilitates routing of messages published to a topic, such as routing messages to those client nodes 104 and 106 that are subscribed to that topic.

MQTT also can use wildcards in topic strings for subscriptions. In MQTT the wildcard "+" matches one level and wildcard "#" matches any number of levels below. Wildcard "#" matches any number of topic levels, so the following subscriptions would match to the published topic string: "topic1/x1/y2/z3/data":

"topic 1/x1/y2/z3/#"
"topic1/x1/y2/#"
"topic1/x1/#"
"topic1/#"
"topic1/+/y2/z3/data"
"topic1/x1/+/y3/data"
"topic1/x1/+/+/data"
"topic1/+/y2/+/data."

Conversely, the subscription "topic1/x1/+/z2/data" would not match to the published topic string above of: "topic1/x1/y2/z3/data."

In an embodiment, the API call of the API 120 causes a set of subscriptions, authorized for at least one of the client nodes 104 and 106, to be communicated to the subscription provisioning database 116. In an embodiment, the set of subscriptions is communicated in a data packet also containing one or more client IDs associated with at least one of the client nodes 104 and 106. The subscription provisioning database 116, in response to receiving the client IDs and the respective topic subscriptions for those client IDs, is caused to store the client IDs and the respective topic subscriptions for query in the subscription database 114 of the broker node 112. In an embodiment, as described herein, the broker node 112 can access the subscription provisioning database 116 to retrieve topic subscriptions authorized for one or more of the client nodes 104 and 106.

In an embodiment, the API call of the API 120 causes a set of subscriptions, authorized for at least one of the client nodes 104 and 106 to be communicated to the subscription database 114 of the broker node 112. Specifically, in an embodiment, the API call of the API 120 bypasses the subscription provisioning database 116, resulting in the set of subscriptions and associated client IDs being allocated directly to the subscription database 114 of the broker node 112. Thus, the API call of the API 120 can allocate topic subscriptions and associated client IDs to the subscription database 114 on behalf of the broker node 112. In an embodiment, those topic subscriptions and associated client IDs allocated to the subscription database 114 can be used by the broker node 112 to disseminate messages to one or more client nodes already coupled to the broker node 112. Furthermore, in an embodiment, those topic subscriptions and associated client IDs allocated to the subscription database 114 can be used by the broker node 112 to disseminate messages to one or more client nodes that connect to the broker node 112 at some point in the future.

In an embodiment, the API call of the API 120 causes a set of subscriptions, authorized for the client node 104, to be communicated to the subscription database 114 of the broker node 112. In an embodiment, the client node 104 is already connected to the broker node 112. The broker node 112 can immediately commence routing messages, having one or more topics matching one or more topic subscriptions in the set of subscriptions, to the client node 104. In an embodiment, the client node 104 connects to the broker node 112 after the API 120 causes the set of subscriptions, authorized for the client node 104, to be communicated to the subscription database 114 of the broker node 112. The broker node 112 can immediately commence routing messages, having one or more topics matching one or more topic subscriptions in the set of subscriptions, to the client node 104 upon its connection to the broker node 112.

The broker node 112 accesses the subscription provisioning database 116 to retrieve topic subscriptions as part of a first impression onboarding process for one of the client nodes 104 and 106. Specifically, when one of the client nodes 104 and 106 connects to the broker node 112 for the first time, the broker node 112 uses a client ID of the client node to retrieve, from the subscription provisioning database 116, topic subscriptions authorized for the client node. Those topic subscriptions can be stored in the subscription database 114 of the broker node 112. Alternatively or in addition, when one of the client nodes 104 and 106 connects to the broker node 112 after a software or hardware update, or other configuration modification, of the client node, the broker node 112 can use the client ID of the reconfigured client node to search the subscription provisioning database 116 for a new or augmented set of topics subscriptions authorized for the reconfigured client node. The new or augmented set of topics subscriptions, obtained from the subscription provisioning database 116, can be used to replace or augment topic subscriptions stored in the subscription database 114 and associated with the reconfigured client node.

Figure 2:
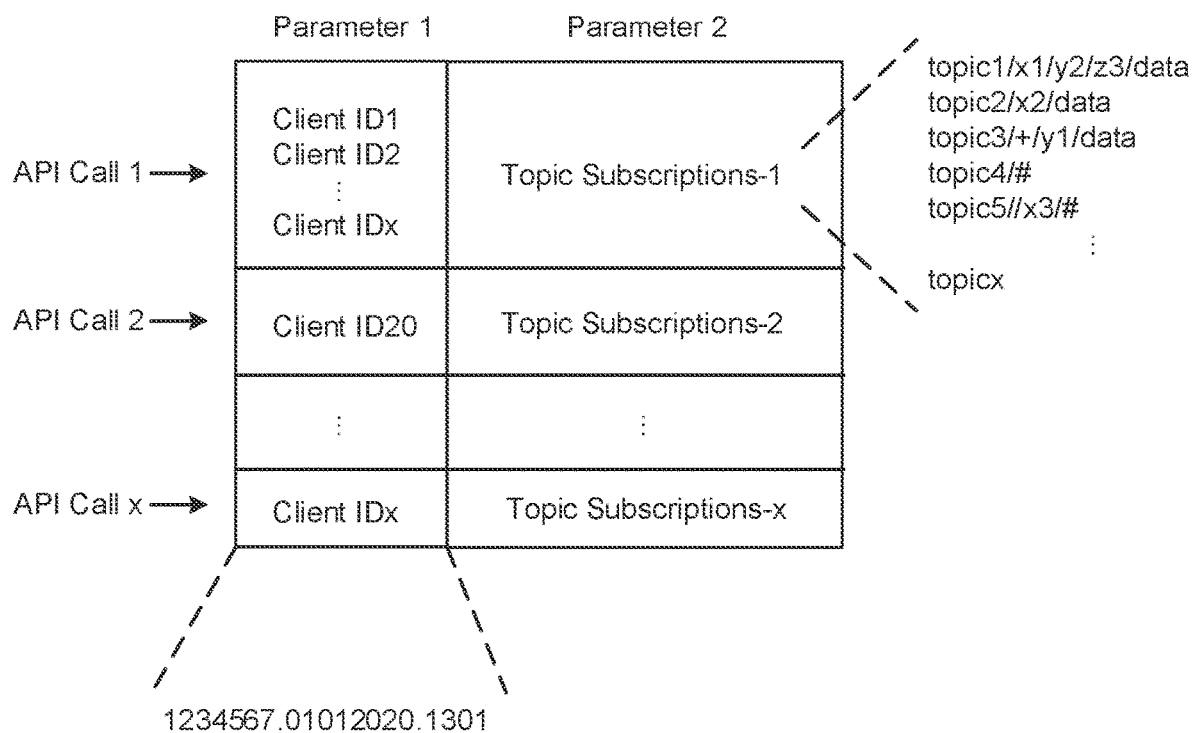
FIG. 2 illustrates exemplary client identifiers (IDs) and associated topic subscriptions that can be provided to a subscription provisioning database, in accordance with at least one embodiment.
Figure 5:
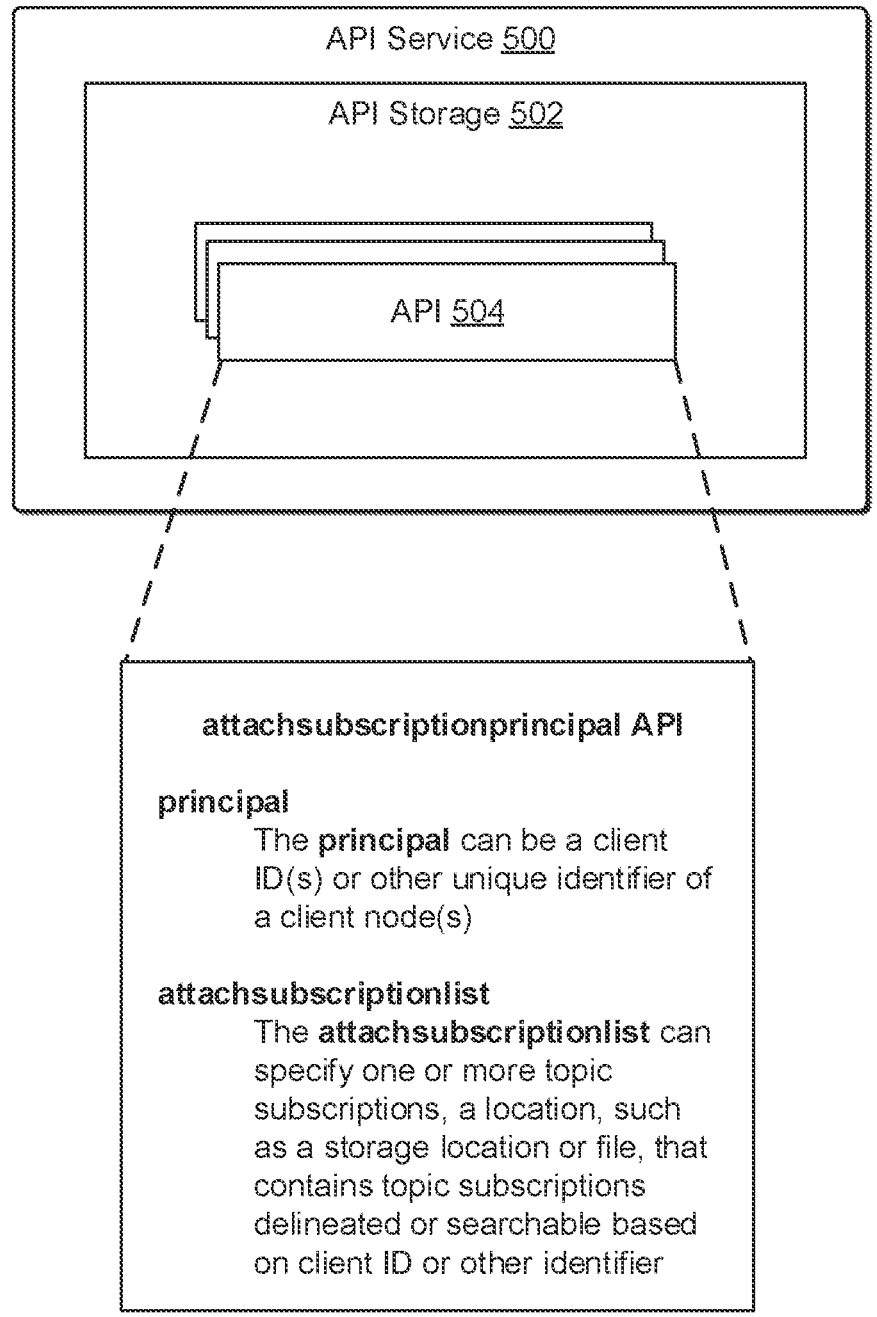
FIG. 5 illustrates an application programming interface (API), in accordance with at least one embodiment.

FIG. 2 illustrates exemplary client IDs and associated topic subscriptions that can be provided to a subscription provisioning database, such as the subscription provisioning database 116 illustrated in FIG. 1B, based on one or more API calls, such as a call to an attachsubscriptionprincipal API illustrated in FIG. 5 and the parameters associated with that API. For example, API call 1 includes a first parameter with a series of client ID1-IDx and a second parameter with associated topic subscriptions-1. Here, each client ID1-IDx is assigned to a unique client node, such as one of the client nodes 104 and 106 illustrated in FIG. 1B. In this example, the client nodes associated with client ID1-IDx are authorized or authenticated for a common set of a subscriptions in the set of topic subscriptions-1. API call 2 includes a first parameter identifying that the client ID20 is authorized or authenticated for the set of topic subscriptions-2 of the second parameter.

In an embodiment, the client ID format used by the API call is in a three-part format (i.e., string1.string2.string3).

String1 is a unique string assigned to a client node. String2 is the date that the unique string was generated. String3 is the time that the unique string was generated on the given date. Thus, the client ID can include the unique string and timestamp information that can comprise date and/or time information. However, other client ID formats can be used. For example, as disclosed, the client ID format can be a certificate RN, namespace indicator, and so forth. Moreover, in some embodiments, client nodes can be assigned the same client ID as other client nodes. Therefore, client nodes can be authenticated for the same set of subscriptions using a single client ID. For example, a call to the attachsubscriptionprincipal API, where the principal parameter specifies a client ID that is common to a plurality of client nodes, can cause the plurality of client nodes to be authenticated for a common set of topic subscriptions.

Figure 3:
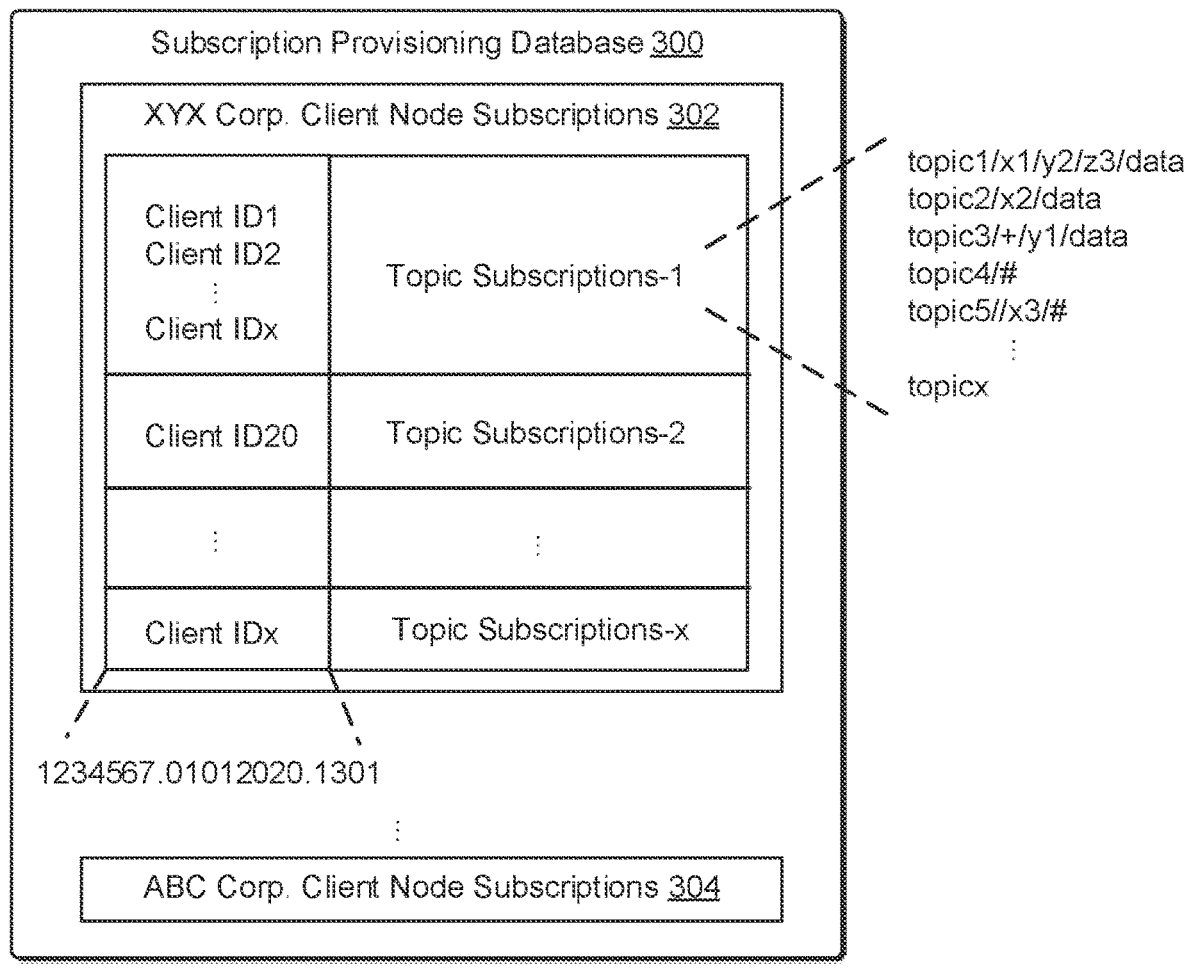
FIG. 3 illustrates a subscription provisioning database, in accordance with at least one embodiment.

FIG. 3 illustrates a subscription provisioning database 300, in accordance with at least one embodiment. In an embodiment, the subscription provisioning database 300 can be used as the subscription provisioning database 116 illustrated in FIG. 1. The subscription provisioning database 300 can be provisioned to include client IDs and respective topic subscriptions authenticated or authorized for client nodes associated with the client IDs. In an embodiment, the subscription provisioning database 300 is provisioned using client ID and topic subscription data obtained from an API call.

In an embodiment, the subscription provisioning database 300 can include topic subscriptions and associated client IDs for at least a plurality of entities. As illustrated, the subscription provisioning database 300 includes topic subscriptions and associated client IDs for XYX Corporation, as shown in client node subscriptions section 302. Additionally, the subscription provisioning database 300 includes topic subscriptions and associated client IDs for ABC Corporation, as shown in client node subscriptions section 304.

The database 300 can reference a plurality of client IDs and topic subscriptions within each entity subscription section 302 and 304. For example, the XYX Corporation subscriptions section 302 references client ID1-IDx and associated topic subscriptions-1. Here, each client ID1-IDx is assigned to a unique client node, such as one of the client nodes 104 and 106 illustrated in FIG. 1B. In this example, the client nodes associated with client ID1-IDx are authorized for a common set of a subscriptions in the set of topic subscriptions-1. The database 300 also identifies that the client node with the client ID20 is assigned the set of topic subscriptions-2. The database 300 can store any number of client IDs and topic subscriptions. Thus, the database 300 is not limited to the storage arrangement illustrated in FIG. 3.

In an embodiment, the client ID format used by the database 300 is in a three-part format (i.e., string1.string2.string3). String1 is a unique string assigned to a client node. String2 is the date that the unique string was generated. String3 is the time that the unique string was generated on the given date.

Figure 4:
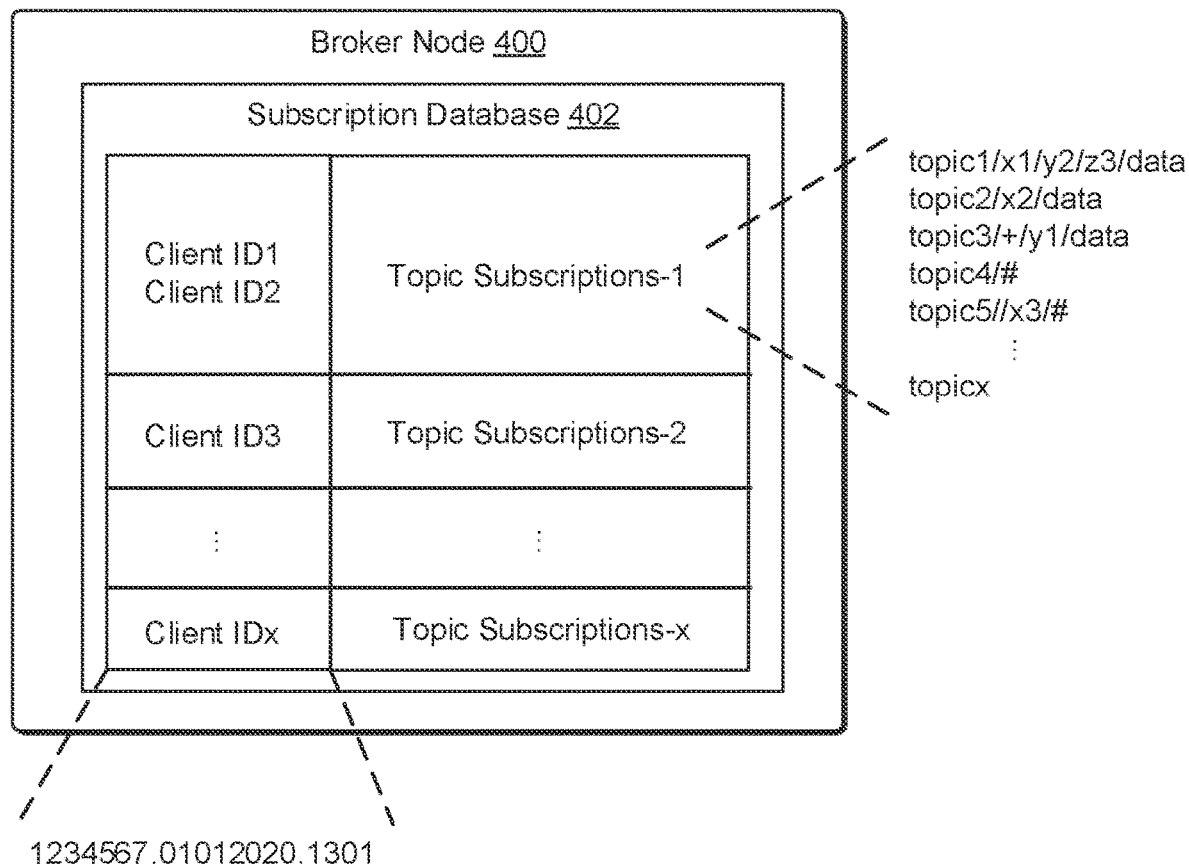
FIG. 4 illustrates a broker node, in accordance with at least one embodiment.

FIG. 4 illustrates a broker node 400, in accordance with at least one embodiment. In an embodiment, the broker node 400 can be used as the broker node 112 illustrated in FIG. 1. In an embodiment, the broker node 400 includes a subscription database 402. The subscription database 402 can be provisioned via the client storage node 200 and the subscription provisioning database 300. In an embodiment, the subscription provisioning database 300 is provisioned based on a programmatic call, such as using the API 120 illustrated in FIG. 1, that obtains client IDs and topic subscriptions from the client storage node 200. Furthermore, the subscription database 402 can be provisioned via the subscription provisioning database 300. In an embodiment, the broker node 400 provisions at least a portion of the subscription database 402, via the subscription provisioning database 300, based on a first impression connection initiated by a client node, such as one of the client nodes 104 and 106 illustrated in FIG. 1B.

In an embodiment, a first impression connection to the broker node 400 is determined based on timestamp information associated with a client ID of the client node connecting to the broker node 400. For example, the broker node 400 can analyze the timestamp information associated with the client ID to determine when the date or timestamp information is later than timestamp reference maintained by the broker node 400. When the broker node 400 determines that the timestamp information of the client ID is later than the timestamp reference maintained by the broker node 400, the broker node 400 uses the client ID and when provided, entity name, to search the subscription provisioning database 300 for topic subscriptions authenticated for a client node associated with the client ID. The timestamp information and reference can include date information and/or time information.

In an embodiment, the first impression connection to the broker node 400 is determined based on comparing the client ID of the client node connecting to the broker node 400 against client IDs already referenced in the subscription database 402. When the broker node 400 does not find the client ID of the client node connecting to the broker node 400, the broker node 400 uses the client ID and when provided, entity name, to search the subscription provisioning database 300 for topic subscriptions authenticated for a client node associated with the client ID.

In an embodiment, the first impression connection to the broker node 400 is determined based on analyzing a software version and/or hardware version indicator of the client node connecting to the broker node 400. When the software version and/or hardware version indicator of the client node connecting to the broker node 400 is later than a software version and/or hardware version indicator reference maintained by the broker node 400, the broker node 400 uses the client ID and when provided, entity name, to search the subscription provisioning database 300 for topic subscriptions authenticated for a client node associated with the client ID. The software version and/or hardware version indicator of the client node connecting to the broker node 400 can be provided by the client node connecting to the broker node 400.

The subscription database 402 can reference a plurality of client IDs and topic subscriptions. In an embodiment, the subscription database 402 can also store an entity name, such as company name, that provides or manufactures the client nodes linked to the client IDs included in the database 402. In an embodiment, subscription database 402 references client ID1-ID2 and associated topic subscriptions-1. Here, each client ID1-ID2 is assigned to a unique client node, such as one of the client nodes 104 and 106 illustrated in FIG. 1B. In this example, the client nodes associated with client ID1-ID2 are authorized or authenticated for a common set of topic subscriptions in the set of topic subscriptions-1. The subscription database 402 also identifies that the client node with the client ID3 is authorized or authenticated for the set of topic subscriptions-2. The subscription database 402 can store any number of client IDs and topic subscriptions. Thus, the subscription database 402 is not limited to the client ID and topic subscriptions illustrated in FIG. 4.

In an embodiment, the client ID format used by the subscription database 402 is in a three-part format (i.e., string1.string2.string3). String1 is a unique string assigned to a client node. String2 is the date that the unique string was generated. String3 is the time that the unique string was generated on the given date.

FIG. 5 illustrates an API service 500, in accordance with at least one embodiment. In an embodiment, the API service 500 can be used as the API service 118 illustrated in FIG. 1. The API service 500 can include an API storage 502. The API storage 502 can include one or more APIs. In an embodiment, the API storage 502 includes an API 504. The API 504 can be used to provision a subscription provisioning database, such as the subscription provisioning database 116 or the subscription provisioning database 300.

The API 504 can include a plurality of parameters. For example, the API 504 (i.e., the attachsubscriptionprincipal API) includes a "principal" parameter. The principal parameter is used to define a client ID or other unique identifier of a client node. In addition, the API 504 can include an "attachsubscriptionlist" parameter. The attachsubscriptionlist parameter can be used to identify topic subscriptions or a location, such as a storage system or file, that includes topic subscriptions delineated or searchable based on client ID or another identifier. The storage system can include topic subscriptions that the API service 500 uses to attach topic subscriptions to client nodes. In an embodiment, the attachsubscriptionlist parameter can be defined to obtain topic subscriptions from a client storage, file, URL, file location path, and so forth.

In an embodiment, the API storage 502 can include a remove topic subscription API (i.e., the detachubscriptionprincipal API). Similar to the API 504, the detach topic subscription API will include at least two parameters. A first parameter can identify a principal, such as a client ID associated with a client node. A second parameter can identify one or more topic subscriptions no longer authorized for the client node. In one example, a call to this API will cause the broker node 112 or 154 to remove the one or more topic subscriptions, for a specified client node, from its subscription database. In another example, a call to this API will cause an update to a database (e.g., the subscription provisioning database 116 of FIG. 1) and, upon detection of a client having a client ID, a broker (e.g., the broker node 112) will use the client ID to query the database, detect one or more differences between subscriptions in that database with subscriptions in its local database (e.g., subscription database 114) and update its local database by removing one or more subscriptions to cause the databases to be consistent for the client ID.

In an embodiment, the API storage 502 can include a list topic subscription API (i.e., the listsubscriptionprincipal API). The list topic subscription API can include at least one parameter. The parameter can identify a principal, such as a client ID associated with a client node. In one example, a call to this API will cause the broker node 112 or 154 to generate and provide a list of one or more topic subscriptions, for a specified client node, from its subscription database (e.g., the subscription database 114). In another example, a call to this API will cause a service associated with another database (e.g., the subscription provisioning database 116 of FIG. 1) to generate and provide a list of one or more topic subscriptions, for a specified client node, from the database.

API calls by the APIs of the API service 500 can be IPC calls or RPCs. IPC calls can be formatted according to a syntax used by the system, such as Python, Ruby, or Swift. RPCs can be formatted according to a syntax used by systems of the online service provider 102, such ONC RPC or SORCER. Additionally, at least some of the APIs of the API service 500 can be REST compliant APIs. The APIs may be exposed to a client application or other common REST tool. For example, if a customer of the provider 102 interacts with a web interface, the APIs may be exposed as JavaScript. In general, a customer can interact with one of the APIs of the API service 118 using an API client (e.g., Postman), a programming language (e.g., Python), or via the terminal of a node (e.g., customer node or a node hosted by the provider 102) by using a command line program (e.g., cURL). APIs and commands of the APIs in the API service 500, including invocation of a single API a plurality of times, can be chained together to form an API script, allowing for the automation and integration of various service features provided using the APIs of the service 500.

Figure 6:
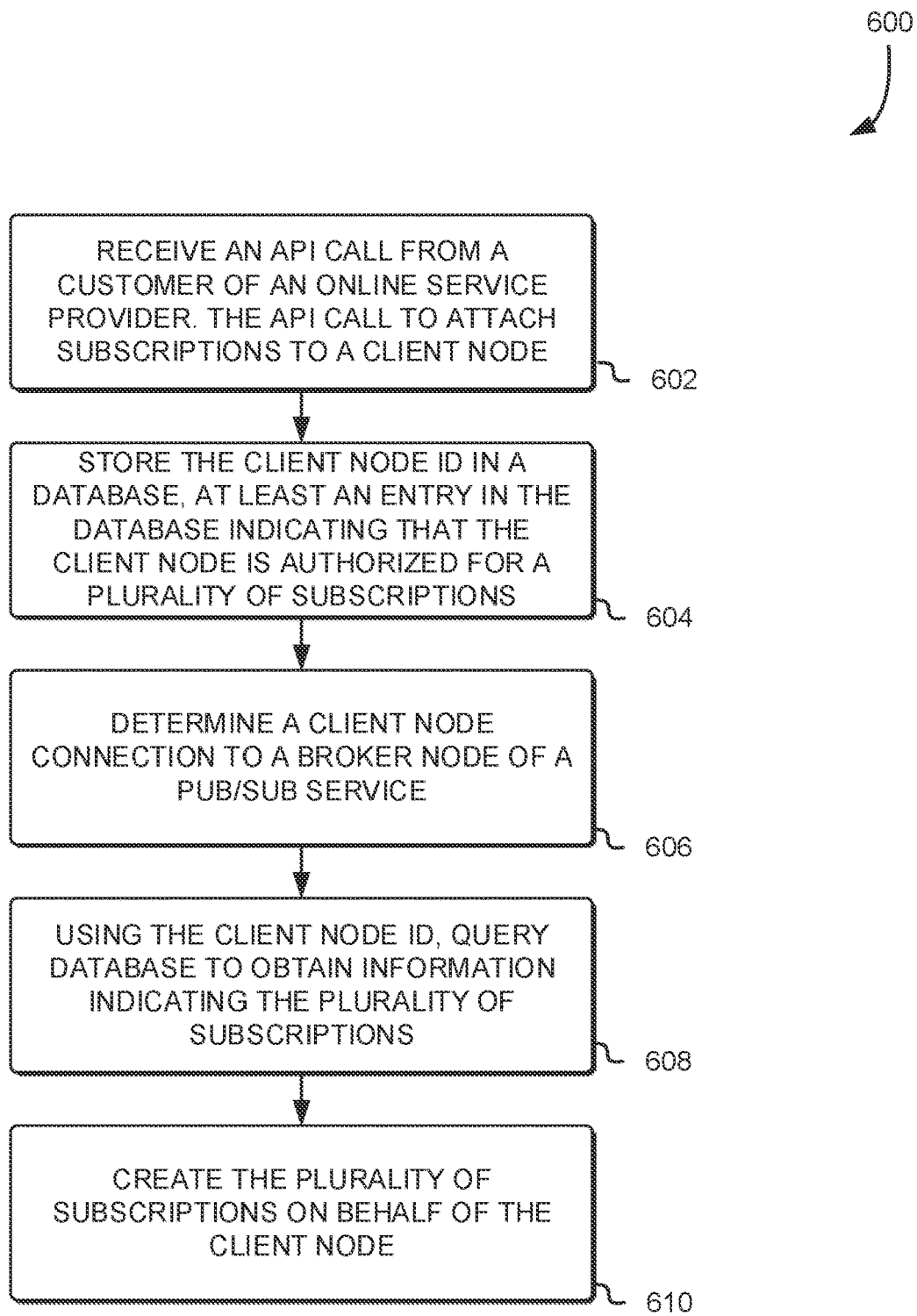
FIG. 6 illustrates a flow diagram including various processing acts, implemented by a system environment with one or more computing devices or nodes, which provide topic subscriptions for computer nodes through a centralized subscription computer system.

FIG. 6 illustrates a flow diagram 600 including various processing acts, implemented by a system environment with one or more computing devices or nodes, which provide topic subscriptions for computer nodes through a centralized subscription computer system. In some implementations, the acts of the flow diagram 600 are executed by one or more computing devices illustrated in FIGS. 1A-5 and 8. The illustrated computing devices may execute computer-executable instructions incorporating at least some of the processing acts of the flow diagram 600 to provide topic subscriptions for computer nodes that couple to a broker service to receive messages related topics that the computer nodes are subscribed to.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage medium. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based devices, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 602, an API call is received. In an embodiment, the API call is made by a customer of an online service provider, such as the online service provider 102. The API call can be made via an API service, such as the API service 118. In an embodiment, the API call is to attach, to a client node identified by a client node ID, a plurality of subscriptions to respective topics. The API call can be made using the API 120 or the API 504.

At 604, at least the client node ID is stored in a database to indicate that the client node is authorized for the plurality of subscriptions. In an embodiment, the client node ID is stored in the subscription provisioning database 116 or the subscription provisioning database 300.

At 606, a client node connection to a publish/subscribe service is determined by a broker node of the publish/subscribe service. In an embodiment, the broker node can determine that the client node authenticated, such as through the online service provider 102, to connect to the public/subscribe service. In an example, the client node can authenticate directly through the public/subscribe service, such as through the broker node of the public/subscribe service.

Authentication by the client node can be accomplished through a typical username/password authentication process, biometric authentication, certificate authentication, and so forth. In an embodiment, the client node, such as one of the client nodes 104 and 106, authenticates to connect to the broker node 112 or the broker node 400.

At 608, the client node ID is used to query the database to obtain information indicating the plurality of subscriptions. In an embodiment, the broker node 112 or the broker node 400 queries the subscription provisioning database 116 or the subscription provisioning database 300 to obtain the information indicating the plurality of subscriptions. In an embodiment, the broker node searches the subscription provisioning database to identify the client node ID stored therein and the plurality of subscriptions that the client node associated with the client node ID is authorized for or assigned to.

At 610, the plurality of subscriptions is created on behalf of the client node. In an embodiment, the plurality of subscriptions is created by obtaining the plurality of subscriptions from the database and storing those plurality of subscriptions in a subscription database of the publish/subscribe service. For example, the broker node 112 or the broker node 400 can obtain the plurality of subscriptions from the subscription provisioning database 116 or 300. The broker node can store the obtained plurality of subscriptions in its subscription database 114 or 402. In an embodiment, the plurality of subscriptions is created on behalf of the client node without receiving a subscribe message from the client node.

Figure 7:
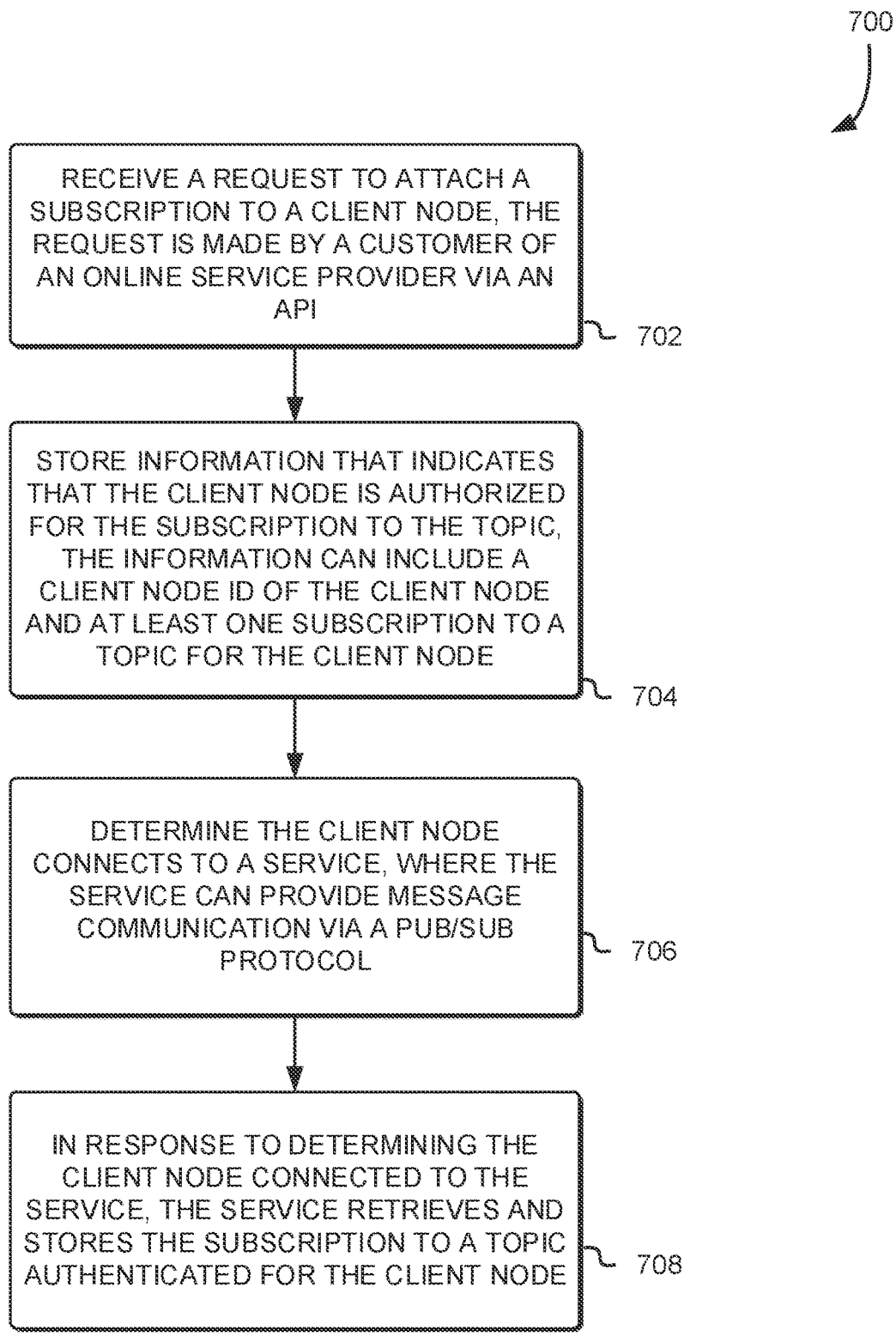
FIG. 7 illustrates a flow diagram including various processing acts, implemented by a system environment with one or more computing devices or nodes, which provide topic subscriptions for computer nodes through a centralized subscription computer system.

FIG. 7 illustrates a flow diagram 700 including various processing acts, implemented by a system environment with one or more computing devices or nodes, which provide topic subscriptions for computer nodes through a centralized subscription computer system. In some implementations, the acts of the flow diagram 700 are executed by one or more computing devices illustrated in FIGS. 1A-5 and 8. The illustrated computing devices may execute computer-executable instructions incorporating at least some of the processing acts of the flow diagram 700 to provide topic subscriptions for computer nodes that couple to a broker service to receive messages related topics that the computer nodes are subscribed to.

At 702, a request to attach a subscription to a topic to a client node is received. In an embodiment, the request to attach the subscription is made by an entity authenticated to an online service provider. The entity can be a customer of the online service provider that possesses authenticated authorization to configure client nodes associated with the customer. In an embodiment, the request to attach the subscription is generated through an API call. The API call can be made through an API service associated with the online service provider. In an embodiment, the API call is made through the API service 118 or the API service 500.

At 704, information is stored that indicates that the client node is authorized for the subscription to the topic. In an embodiment, the information can include a client node ID that is stored in the subscription provisioning database 116 or the subscription provisioning database 300.

At 706, a connection by the client node to a service is determined. In an embodiment, the client node connects to a service that implements a publication/subscription communication protocol. For example, the client node can connect to the broker node 112 or the broker node 400. The broker node 112 or the broker node 400 can determine connection of the client node by receiving its client node ID.

At 708, in response to determining the client node connected to the service, the service retrieves and stores the subscription to the topic authenticated for the client node. In an embodiment, the broker node uses the client node ID to query the subscription provisioning database 116 or the subscription provisioning database 300 to identify the subscription to the topic authorized or authenticated for the client node. The broker node retrieves the subscription to the topic and saves (i.e., creates) the subscription to the topic in its subscription database, such as the subscription database 114 or the subscription database 402. In an embodiment, the broker node determines to create the subscription to the topic based on whether the connection by the client node is a first impression connection by the client node to the broker node.

Figure 8:
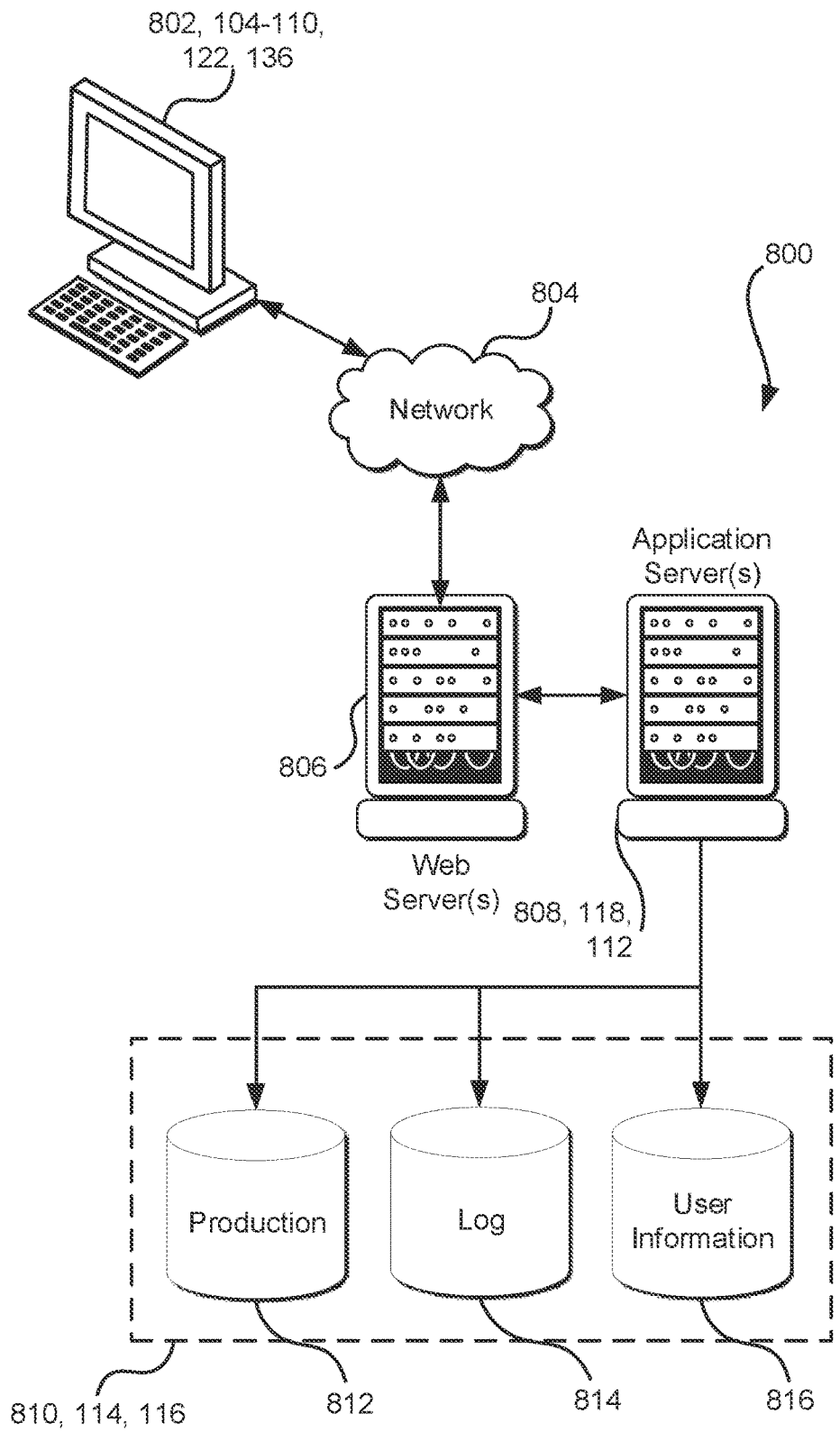
FIG. 8 illustrates a system in which various embodiments can be implemented.

FIG. 8 illustrates aspects of an example system 800 for implementing aspects in accordance with an embodiment. At least some of the devices of the example system 800 can be used to implement one or more of the described systems, nodes, services, databases, storages, and so forth, as described and illustrated in the other FIGURES of this disclosure. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
   one or more processors; and
   memory that stores computer-executable instructions that are executable by the one or more processors to cause the system to:
      receive an application programming interface (API) call to attach, to a client node identified by a client node identifier (ID) specified in the API call, a plurality of subscriptions to respective topics, the API call further specifying the plurality of subscriptions to the respective topics, the API call at least in part caused by a workflow service initiated in advance of the client node connecting to a broker of a publish/subscribe service;
      based on the API call, store at least the client node ID in a database to indicate that the client node is authorized for the plurality of subscriptions; and
      as a result of the client node authenticating to connect to the broker of the publish/subscribe service:
         use the client node ID to query the database to obtain information indicating the plurality of subscriptions; and
         without receiving a publish/subscribe protocol subscribe message from the client node, create the plurality of subscriptions on behalf of the client node to cause messages published to topics of the respective topics to be transmitted to the client node.

2. The system of claim 1, wherein the stored computer-executable instructions that are executable by the one or more processors are to further cause the system to:
   based on the API call, store the plurality of subscriptions to the respective topics in the database, the plurality of subscriptions to the respective topics stored for query at least based on the client node ID, the plurality of subscriptions to the respective topics accessible by the broker of the publish/subscribe service to determine the plurality of subscriptions authorized for the client node.

3. The system of claim 1, wherein creating the plurality of subscriptions comprises storing the plurality of subscriptions in a database associated with the broker, the broker to route messages between at least one client node to publish messages associated with a topic and at least one client node subscribed to the topic, and wherein the stored computer-executable instructions that are executable by the one or more processors are to further cause the system to:
   cause the broker to transmit a message to the client node, the message having an associated topic comprised in the respective topics associated with the plurality of subscriptions.

4. The system of claim 1, wherein the stored computer-executable instructions that are executable by the one or more processors are to further cause the system to:
   use the client node ID to determine the client node authenticated to connect to the broker of the publish/subscribe service for a first time; and
   based on determining the client node authenticated to connect for the first time, store the plurality of subscriptions to the respective topics in a subscription database associated with the broker.

5. A computer-implemented method, comprising:
   storing information that indicates a client node is authorized for a subscription, storing the information caused at least by a programmatic interface call comprising information identifying the client node and the subscription, the programming interface call executed prior to the client node connecting to a service implementing the publish/subscribe messaging protocol, and wherein the programming interface call is caused to execute by a workflow service to confirm that the client node has authorized access to the service implementing the publish/subscribe messaging protocol; and
   as a result of the client node successfully connecting to a service implementing the publish/subscribe messaging protocol:
      retrieving the stored information;
      determining, based on the subscription indicated in the stored information, a topic; and
      creating a subscription to the determined topic to cause a message published to the topic to be transmitted to the client node.

6. The method of claim 5, wherein storing the information comprises storing, in a database, a client node identifier (ID) assigned to the client node and the subscription authorized for the client node, storing the client node ID and the subscription based on a programmatic interface call to a computer storage comprising a plurality of client node IDs and subscriptions authenticated for client nodes associated with a plurality of client node IDs.

7. The method of claim 5, wherein storing the information is caused by an application programming interface (API) call at least in part initiated by a customer of an online service provider providing the service.

8. The method of claim 7, wherein the API comprises at least two parameters, a first of the two parameters to indicate a client node identifier (ID) assigned to the client node and a second of the two parameters to indicate the subscription authorized for the client node.

9. The method of claim 5, further comprising determining the connection by the client node was a first impression connection by the client node, and wherein retrieving the stored information, determining the topic, and creating the subscription are executed based on determining the connection by the client node was the first impression connection by the client node.

10. The method of claim 9, wherein determining the connection by the client node was the first impression connection by the client node comprises determining that a client node identifier (ID) of the client node is not stored in a database of the service, determining that the client node has an updated software or hardware configuration, or analyzing at least timestamp information contained in the client node ID of the client node.

11. The method of claim 5, wherein the service comprises a broker node that implements at least a message queuing telemetry transport (MQTT) communication protocol, the broker node to use the MQTT communication protocol to facilitate message communication between a plurality of client nodes, the client node is associated with the plurality of client nodes.

12. The method of claim 5, wherein creating the subscription to the determined topic is not caused by a topic subscription publish/subscribe protocol message from the client node.

13. A non-transitory computer-readable storage medium storing thereon executable instructions that, as a result of being executed by one or more processors of a computer system, cause the computer system to:
  receive a request to attach a topic subscription to a client node, the request identifying the client node and authenticated as from an entity, the request further including the topic subscription to attach to the client node, the request to attach the topic subscription to the client node received by a service implementing a publish/subscribe messaging protocol to route communications between a plurality of client nodes, the request to attach initiated by a service triggered prior to the client node connecting to the service implementing the publish/subscribe messaging protocol;
  in response to the request, store information that indicates the client node is authorized for the topic subscription; and
  determine a connection by the client node to the service implementing the publish/subscribe messaging protocol, the connection to trigger the topic subscription to be created for the client node.

14. The non-transitory computer-readable storage medium of claim 13, wherein the instructions further comprise instructions that, as a result of being executed by the one or more processors, cause the computer system to:
  store a programmatic interface usable to generate the request to attach the topic subscription to the client node, the programmatic interface available to the entity based on the entity having successfully authenticated to an online service provider that stores the programmatic interface in a computer system of the online service provider.

15. The non-transitory computer-readable storage medium of claim 13, wherein the instructions further comprise instructions that, as a result of being executed by the one or more processors, cause the computer system to execute an application programming interface (API) to cause receiving the request to attach the topic subscription to the client node, the API to further cause storing the information that indicates the client node is authorized for the topic subscription.

16. The non-transitory computer-readable storage medium of claim 13, wherein the service comprises a broker node that implements at least a message queuing telemetry transport (MQTT) communication protocol, the broker node to use the MQTT communication protocol to facilitate message communication between the plurality of client nodes, the client node is associated with the plurality of client nodes.

17. The non-transitory computer-readable storage medium of claim 13, wherein creating the topic subscription is not caused by a topic subscription publish/subscribe protocol message from the client node.

18. The non-transitory computer-readable storage medium of claim 13, wherein storing information that indicates the client node is authorized for the topic subscription comprises obtaining the information from an application programming interface (API) call initiated by a customer of an online service provider.

19. The non-transitory computer-readable storage medium of claim 13, wherein determining the connection by the client node to the service comprises determining the connection by the client node was a first impression connection by the client node to the service, the first impression connection by the client node to the service causing the service to create the topic subscription for the client node.

20. The non-transitory computer-readable storage medium of claim 19, wherein determining the connection by the client node was the first impression connection by the client node comprises determining that a client node identifier (ID) of the client node is not stored in a database of the service, determining that the client node has an updated software or hardware configuration, or analyzing at least timestamp information contained in the client node ID of the client node.

* * * * *